(12) United States Patent
Hornick et al.

(10) Patent No.: US 7,117,391 B1
(45) Date of Patent: Oct. 3, 2006

(54) CHECKPOINT MODEL BUILDING FOR DATA MINING

(75) Inventors: Mark F. Hornick, Andover, MA (US); Pavani Kuntala, Nashua, NH (US); Gary Drescher, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 550 days.

(21) Appl. No.: 10/284,088

(22) Filed: Oct. 31, 2002

(51) Int. Cl.
*G06F 11/00* (2006.01)

(52) U.S. Cl. .......................................... 714/15; 714/35
(58) Field of Classification Search .................. 714/19, 714/15, 21, 35
See application file for complete search history.

(56) References Cited

U.S. PATENT DOCUMENTS

| | | | |
|---|---|---|---|
| 5,146,460 A | * | 9/1992 | Ackerman et al. ............. 714/33 |
| 5,630,047 A | * | 5/1997 | Wang ............................ 714/15 |
| 5,828,821 A | * | 10/1998 | Hoshina et al. ............... 714/15 |
| 6,105,148 A | * | 8/2000 | Chung et al. .................. 714/16 |

* cited by examiner

*Primary Examiner*—Dieu-Minh Le
(74) *Attorney, Agent, or Firm*—Bingham McCutchen LLP (57) ABSTRACT

The notion of checkpointing model building is introduced to safeguard against the loss of computational results due to abnormal termination of long running computation algorithms. A checkpoint manager initiates a checkpoint, wherein initiation occurs by various scenarios, including dynamically, automatically and manually. A computation module executes the checkpoint on an in progress data computation. The checkpoint manager also monitors the execution of the checkpoint for abnormal termination. Upon a determination of abnormal checkpoint termination, the inability to resume model building from a checkpoint, the checkpoint manger either resumes model build from the checkpoint or aborts the model build.

40 Claims, 6 Drawing Sheets

Algorithm 312a:
    5<sup>th</sup> iteration ~602
    3% error ~604
    700,000 records ~606
    X weight, Y topology ~608

•
•
•

Algorithm 312n:
    9<sup>th</sup> iteration ~602
    1.2% error ~604
    201,000 records ~606
    X weight, Y topology ~608

CHECKPOINT MODEL BUILDING FOR DATA MINING

BACKGROUND OF THE INVENTION

1. Field of the Invention

The present invention relates to a method, system and computer program product for checkpointing. More particularly, the present invention relates to a method, system and computer program product of checkpointing model building for data mining.

2. Description of the Prior Art

The present invention relates to a method, system and computer program product of checkpointing model building for data mining. Generally, software that performs compute intensive tasks, such as data mining, implement long running model build data analysis algorithms. These algorithms may terminate abnormally or fail before their completion resulting in the loss of time, waste of computing effort and inability to make time critical decisions. Algorithms may terminate abnormally due to loss of poser, network service interruption, schedule machine downtime, hardware failure, or software errors, such as operating system applications. One of the reasons for the loss of time, waste of computing effort and inability to make time critical decisions is that the applications implementing the model build algorithms assume that a model build will complete successfully. Accordingly, a built model is not saved until the model build data analysis algorithms are completed. Saving model builds only at the completion of model build data analysis algorithms fails to safeguard against the loss of time, waste of computing effort and inability to make time critical decisions in the event of abnormal termination of model builds.

Therefore, there is a need for a checkpointing system and method for long running model build algorithms. In addition, there is a need for the checkpointing to occur through manual, dynamic, and automated initiation. There is also a need for the checkpointing to generate an intermediate representation of a model. Moreover, there is a need for the intermediate representation to be stored in non-volatile storage.

SUMMARY OF THE INVENTION

The present invention is a method, system, and computer program product for checkpointing model building, where model building is performed by a model build process implemented for data mining so as to safeguard against abnormal termination of the model building process.

A method of checkpoint model building comprises the steps of initiating a checkpoint on the model build process, the model building process generating a model in accordance with one or more data analysis algorithms, executing the checkpoint on a set of the one or more data analysis algorithms, the set based on steps for initiating the checkpoint, and monitoring for one or more operation failures to maintain model building process integrity.

In an embodiment of the present invention, the steps for initiating the checkpoint include receiving an explicit request from a user to perform the checkpoint on the set, the set having each of the one or more analysis algorithms.

In an embodiment of the present invention, the steps for initiating the checkpoint include receiving a request from one of the analysis algorithms to perform the checkpoint on the set, the set having the one of the analysis algorithms. The request includes an analysis algorithm ID, the analysis algorithm ID identifying the one of the analysis algorithms.

In an embodiment of the present invention, the steps for initiating the checkpoint include obtaining a checkpoint interval parameter from a checkpoint configuration table, the checkpoint interval parameter specifying a frequency in which to automatically perform the checkpoint on the set, the set having each of the analysis algorithms.

In an embodiment of the present invention, the steps for executing include determining a checkpoint state for each of the analysis algorithms in the set, suspending each of the analysis algorithms in the set at the checkpoint state, generating an intermediate representation based on the analysis performed by each of the analysis algorithms in the set up to the checkpoint state, storing the intermediate representation, and resuming each of the analysis algorithms in the set at the checkpoint state.

In an embodiment of the present invention, the steps for monitoring include re-loading the checkpoint and instructing the algorithms to continue executing from the checkpoint state on the set of the one or more data analysis algorithms upon identifying a failure of the algorithm execution.

In an embodiment of the present invention, the steps for wherein the monitoring includes terminating the analysis of one or more of the analysis algorithms.

BRIEF DESCRIPTION OF THE DRAWINGS

The details of the present invention, both as to its structure and operation can best be understood by referring to the following description with reference to the accompanying drawings in which.

DETAILED DESCRIPTION OF THE INVENTION

The present invention is now described more fully hereinafter with reference to the accompanying drawings that show a preferred embodiment of the present invention. The present invention, however, may be embodied in many different forms and should not be construed as limited to embodiments set forth herein. Appropriately, this embodiment are provided so that this disclosure will be thorough and complete, and will fully convey the scope of the present invention.

The present invention is a model building process that enables fault tolerant model building.

Figure 1:
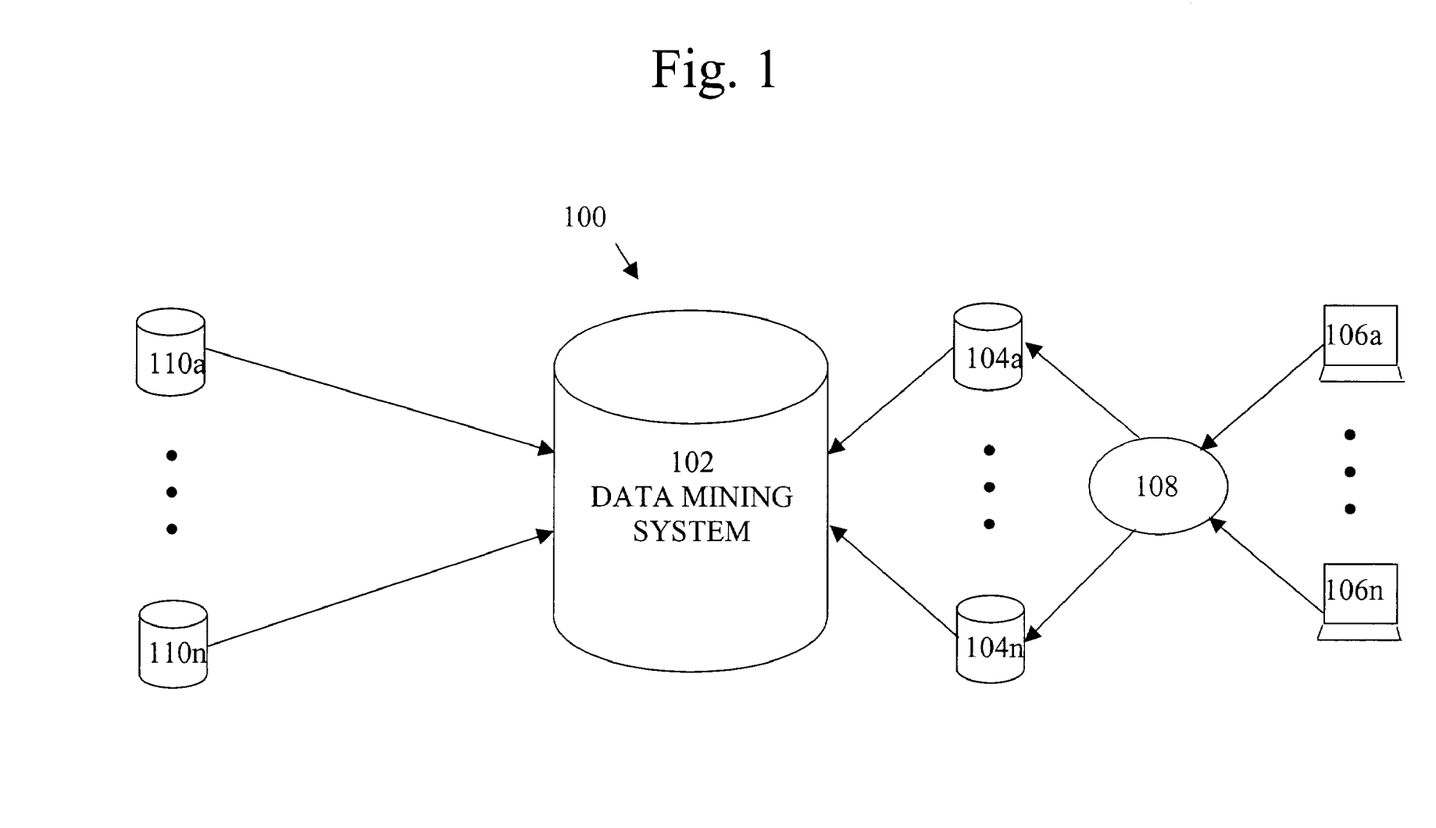
FIG. 1 is an exemplary block diagram of a data mining system, in which the present invention may be implemented.

FIG. 1 is an exemplary block diagram of a data mining system, in which the present invention may be implemented. In the embodiment of FIG. 1, system 100 may be implemented to perform data mining. System 100 includes a data mining system 102 connected to a number of data sources, such as systems 110a–110n and 104a–104n. System 110a–110n includes data sources inaccessible to the public, such as proprietary or internal data sources. Systems 104a–104n includes data sources accessible to the public, such as over the Internet, privately accessible, such as implementing secure connection technology, or a combination thereof. The data provided by systems 104a–104n and 110a–110n may be of any type and in any format. System 102 may utilize the data in systems 104a–104n and 110a–110n to build models for data mining.

Figure 2:
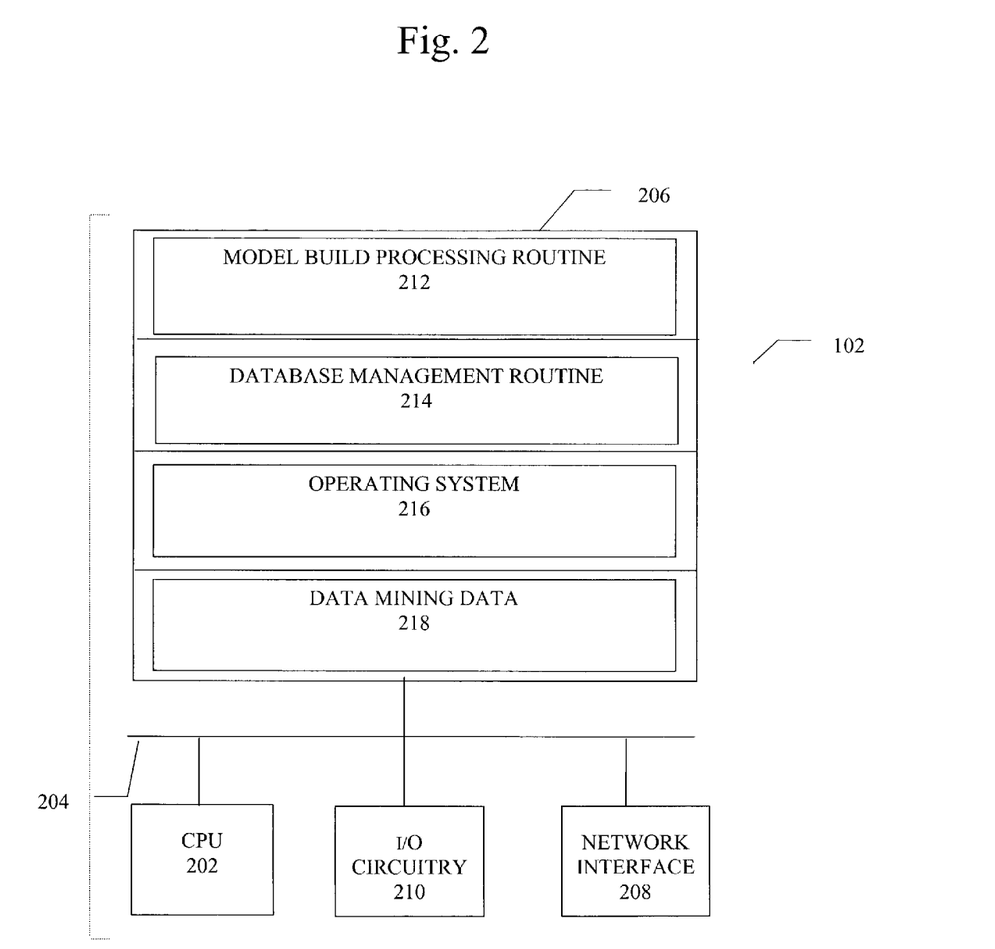
FIG. 2 is an exemplary block diagram of a data mining system illustrated in FIG. 1, in which the present invention may be implemented.

FIG. 2 is an exemplary block diagram of system 102 illustrated in FIG. 1, in which the present invention may be implemented. System 102 is a database management system that includes data mining and checkpoint functionality. In the FIG. 2 embodiment, System 102 is a general purpose computer, such as a workstation, personal computer, server or the like, but may be any computer that executes program instructions in accordance with the present invention. System 102 includes a processor (CPU) 202 connected by a bus 204 to memory 206, network interface 208 and I/O circuitry 210. In the FIG. 2 embodiment, CPU 202 is a microprocessor, such as an INTEL PENTIUM® processor, but may be any processor that executes program instructions in order to carry out the functions of the present invention. As shown, CPU 202 and the various other components of the server 102 communicate through a system bus 204 or similar architecture. Network interface 208 provides an interface between system 102 and a network, such as Internet 108. The network may be a local area network (LAN), a wide area network (WAN), or combinations thereof. I/O circuitry provides an interface for the input of data to and output of data from system 102. I/O circuitry includes input devices, such as trackball, mice, touchpads and keyboards, and output devices, such as printers and monitors.

In the FIG. 2 embodiment, memory 206 stores routines for execution by CPU 202. Memory 206 also stores data that is manipulated under the direction of CPU 202. Memory includes memory devices, such as read only memory (ROM), random access memory (RAM) hard disks, CD-ROMs, floppy disks, optical storage devices, magnetic storage devices, etc.

Memory 206 includes routines, such as model build processing routine 212, database management routines 214, and operating system 216, as well as data, such as data mining data 218. In the FIG. 2 embodiment, routines include program instructions, which implement object-oriented technology, such as Java and C++. The program instructions provide the functionality implemented by their respective routine. The program instructions may be recorded on a computer readable medium and loaded into memory 206.

Data mining data 218 includes data organized in rows and columns, such as relational database tables and market basket database matrix. Data mining data 218, serves as inputs to routines, such as model build processing routine 212. Model build processing routine 212 includes data analysis algorithms, such as supervised and unsupervised learning algorithms, association analysis algorithms and clustering algorithms. Model build processing routine 212 executes data analysis algorithms 312a–312n to construct model builds for data mining. In the FIG. 2 embodiment, model build processing routine also includes checkpoint process routines. Checkpoint process routines provide model building processing routine 212 with checkpoint functionality. Database management routines 214 provides database management functionality, such as preprocessing of data mining data 218 and query processing. Operating system 216 provides overall system functionality, such as management of routines in memory 206.

Figure 3:
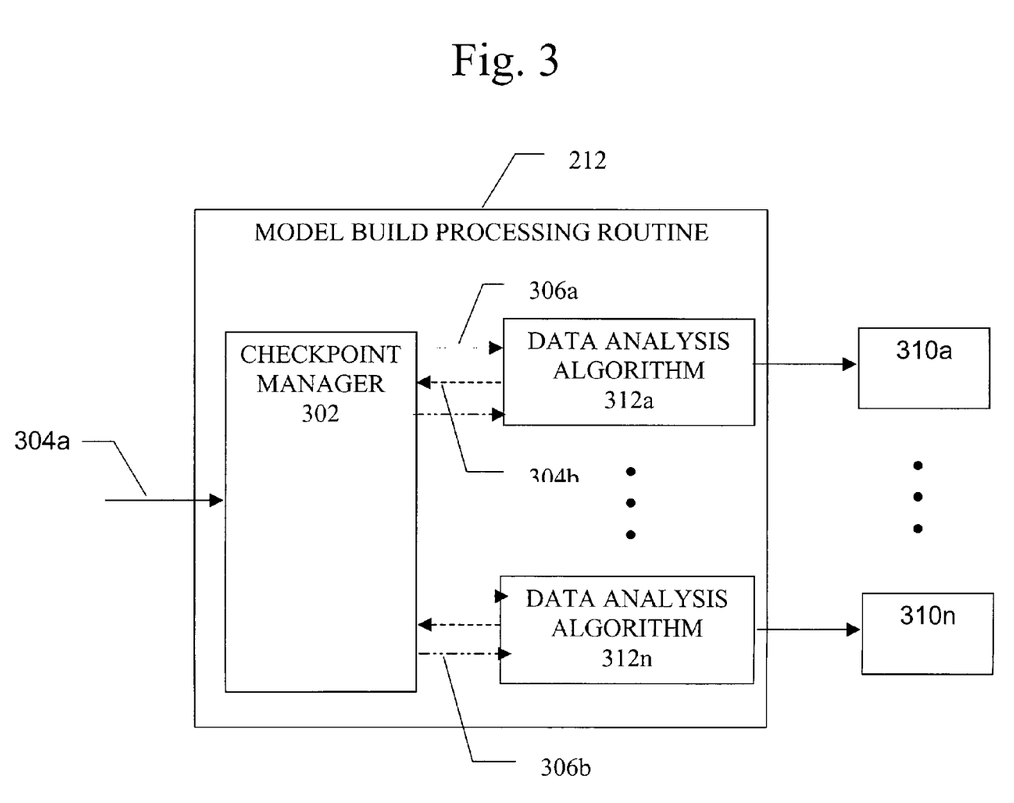
FIG. 3 is an exemplary block diagram of model build processing routine 212 illustrated in FIG. 2 implemented by the present invention.

FIG. 3 is an exemplary block diagram of model build processing routine 212 illustrated in FIG. 2 implemented by the present invention. In the FIG. 3 embodiment, analysis algorithms, such as data analysis algorithms 312a–312n, are software routines that examine data to identify patterns and relationships between the data and construct model builds that express predictions about new or subsequent data based on the analysis of the data, but may be any routines that perform computation on data to construct a result based on the data. In the FIG. 3 embodiment, data analysis algorithms 312a–312n may also periodically detect and provide interrupts as well as execute checkpoints. Checkpoints enable fault tolerant model building. Interrupts periodically detected by analysis algorithms 312a–312n may include checkpoint initiation interrupts 306a and integrity interrupts 306b. Interrupts periodically provided may include checkpoint invocation interrupts 304a and failure interrupts 304b.

In the FIG. 3 embodiment, checkpoint manager 302 manages checkpoints and system integrity functions and enables fault tolerant model building. The management of checkpoints and system integrity functions includes periodically detecting and providing of interrupts 304 and 306. Checkpoint manager 302 may periodically provide checkpoint initiation interrupts 306a and integrity interrupts 306b. Checkpoint initiation interrupts 306a may be provided to one or more analysis algorithms 312a–312n to initiate the execution of checkpoints by the one or more analysis algorithms 312a–312n. Integrity interrupts 306b may be provided to one or more analysis algorithms 312a–312n to initiate the re-loading of checkpoints and instruct the one or more analysis algorithms 312a–312n to continue execution from the checkpoint state or abort model building of the one or more analysis algorithms 312a–312n.

In the FIG. 3 embodiment, checkpoint manager 302 may also periodically detect checkpoint invocation interrupts 304a and failure interrupts 304b. Checkpoint invocation interrupts 304a are provided by a source to notify checkpoint manager 302 to initiate the execution of checkpoints by one or more analysis algorithms. Checkpoint invocation interrupt 304a may originate from a number of sources, such as a user, an analysis algorithm 312a–312n and checkpoint manager 302. The source of the checkpoint invocation interrupt 304 determines the one or more data analysis algorithms 312a–312n, which will execute checkpoints. Checkpoint invocation interrupts 304a may include identification information indicating the source of the interrupt 304a. Checkpoint invocation interrupts 304a may be provided at a frequency defined by a checkpoint interval parameter provided in a configuration table.

Failure interrupts 304b are provided by a source to notify checkpoint manager 302 to initiate the re-loading of checkpoints and instruct the one or more analysis algorithms 312a–312n to continue execution from the checkpoint state or abort model building of the one or more analysis algorithms 312a–312n. Failure interrupt 304b may originate from one or more analysis algorithm 312a–312n. The origin of the failure interrupt 304b determines the one or more data analysis algorithms 312a–312n, which will re-load checkpoints or abort model building.

Figure 4:
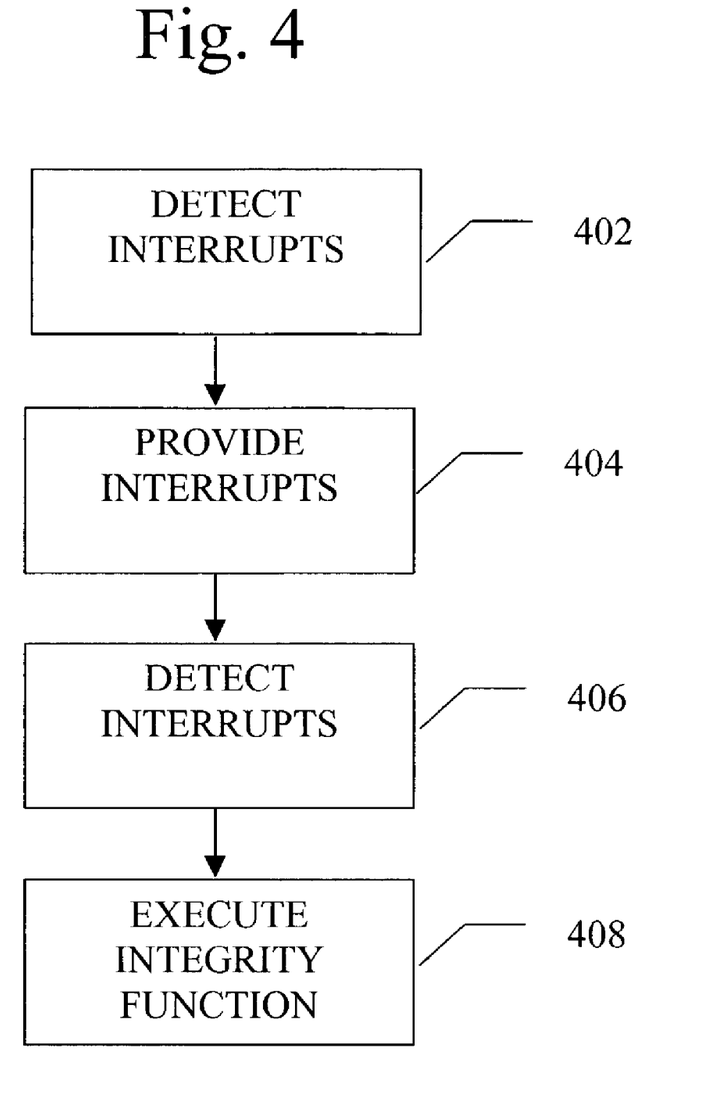
FIG. 4 is an exemplary flow diagram of a checkpoint process, which may be implemented by the model build processing routine shown in FIG. 3.

FIG. 4 is an exemplary flow diagram of a checkpoint process, which may be implemented by the model build processing routine shown in FIG. 3. In the embodiment of FIG. 4, the process begins with step 402, in which checkpoint manager 302 may detect interrupts. The interrupts notify checkpoint manager to initiate the execution of integrity functions. The interrupts may originate from a number of sources including a user, checkpoint manager and data analysis algorithms.

In step 404, checkpoint manager 302 may provide interrupts. In the FIG. 4 embodiment, the interrupts provided are based on the interrupt detected by checkpoint manager 302 in Step 402. The interrupts notify a set of one or more data analysis algorithms 312a–312n to execute integrity functions. The set of the one or more data analysis algorithms 312a–312n may be based on the source of the interrupt detected by checkpoint manager 302 in Step 402. In the FIG. 4 embodiment, the set includes each of the analysis algorithms 312a–312n for interrupts originating from a user and checkpoint manger 302. The set includes one or more respective analysis algorithms 312a–312n for interrupts originating from one or more analysis algorithms.

In step 406, one or more analysis algorithms 312a–312n may detect an interrupt. The interrupts notify a set of one or more analysis algorithms to execute integrity functions. The checkpoint manager 302 determines the set of one or more analysis algorithms. The integrity functions may include checkpoints, re-execution checkpoints and abort model building.

In Step 408, integrity functions may be executed. The integrity functions may be executed on a set of the one or more analysis algorithms. In the FIG. 4 embodiment, the integrity functions executed are based on the interrupts provided in Step 404. Checkpoints generate intermediate models representing a state from which model building can be resumed for each of the one or more analysis algorithms in the set. Checkpoint re-loading immediately attempts to re-execute a checkpoint on each of the one or more analysis algorithms in the set. Abort model build automatically aborts model building of each of the one or more analysis algorithms in the set if the data mining system 102 determines it is impossible to complete the need build successfully.

Figure 5:
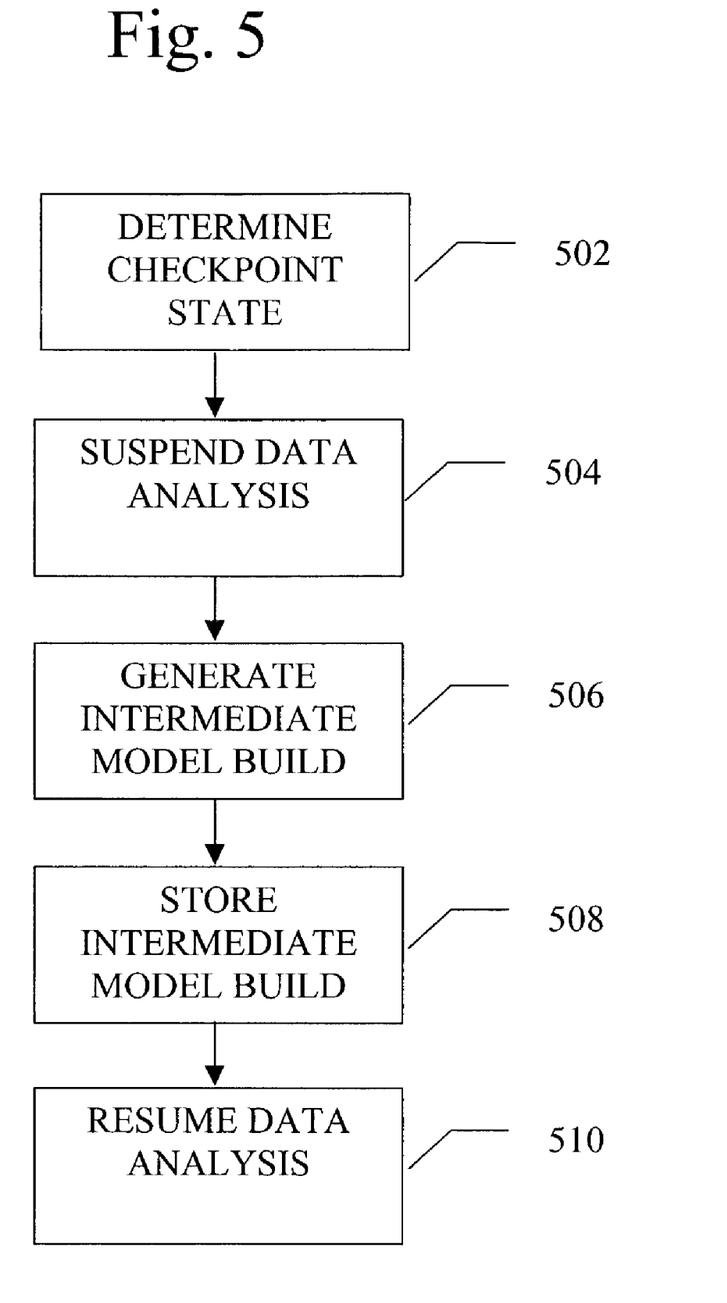
FIG. 5 is an exemplary flow diagram of a execute checkpoint step, which may be implemented by the checkpoint process shown in FIG. 4.

FIG. 5 is an exemplary flow diagram of the checkpoint function, which may be implemented by the checkpoint and checkpoint re-execute integrity functions, shown in FIG. 4. In the FIG. 5, embodiment, the process begins with step 502, in which a checkpoint state is determined for each of the analysis algorithms 312a–312n in the set. A checkpoint state corresponds to a point in the analysis of the data mining data 218 where analysis can be resumed later. The characteristics of the information at a checkpoint state that enables resuming a model build may be specific to each analysis algorithm 312a–312n in the set.

Figure 6:
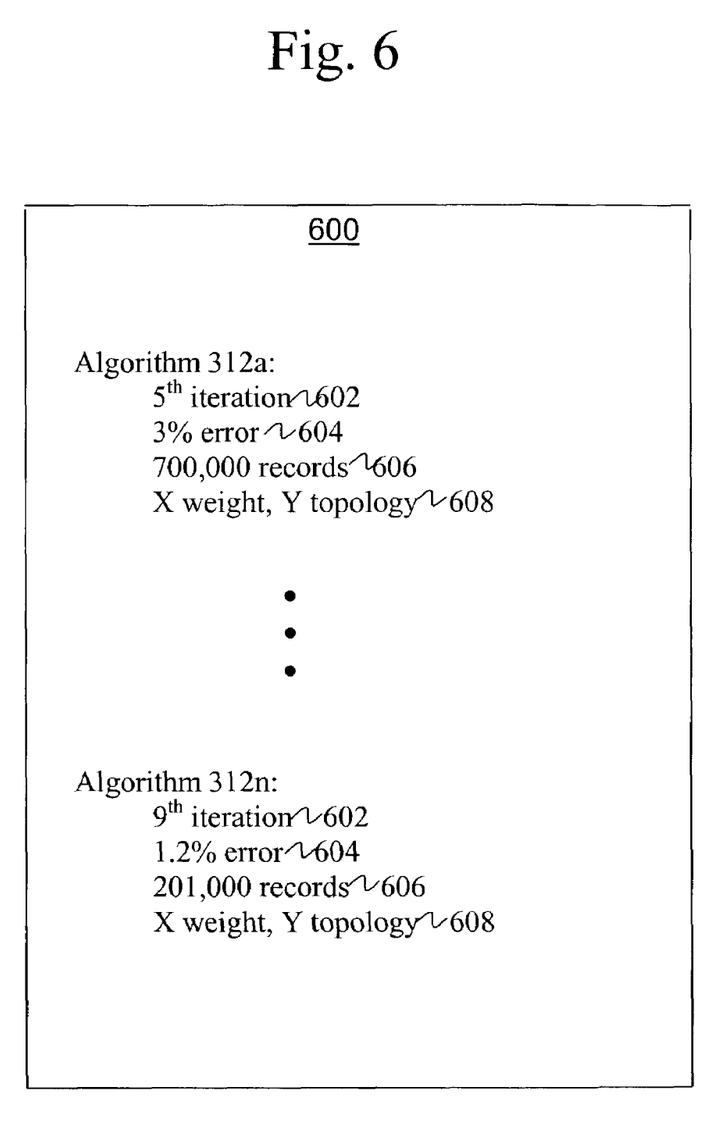
FIG. 6 is an exemplary embodiment of checkpoint state information.

Turning now briefly to FIG. 6. In the embodiment of FIG. 6, the checkpoint information 600 obtained and stored at a checkpoint state may include, for example in a neural network, the number of computational iterations performed on a data set 602, the set of accumulated error 604, the number of records in the data set that have been completed for the current iteration 606, as well as the set of weights and topology 608 used by the algorithm. Information of a similar nature may also be generated for each specific thread being implemented by an analysis algorithm 312a–312n. The number of computational iterations represents the number of passes that the respective analysis algorithm has made through the data set. The set of accumulated error represents the adjustment to be made to the weights as specified by the specific neural network algorithm. The number or records in the data set represents how many records have been processed out of all the records in the data set for the current iteration. The set of weights and topology are part of the algorithm's architecture and defines the state essential to allow the build process to resume.

Returning now to FIG. 5. In step 504, the analysis of the data mining data 218 by each of the analysis algorithms in the set is suspended at the checkpoint state. In step 506, an intermediate model build representation is generated for each of the analysis algorithms in the set based on the analysis of data mining data 218 up to the checkpoint state. An intermediate model build representation requires sufficient detail to enable its respective data analysis algorithm to repopulate in memory data structures, so that model build can continue in the event of hardware or software failure. Intermediate model build representation may be generated according to a DTD specification and provided in format XML.

In step 508, the intermediate representation is stored. The intermediate representation may be stored in non-volatile data structure. The data structure may include file systems and databases. The intermediate representation may be stored as an XML string corresponding to the DTD specification. In step 510, the analysis of the data mining data 218 by each of the analysis algorithms in the set is resumed at the checkpoint state.

The present invention is described hereinabove with reference to flowchart illustrations of methods, apparatus (systems), methods of doing business and computer program products according to the invention. It will be understood that each block of the flowchart illustrations, and combinations of blocks in the flowchart illustrations, can be implemented by computer program instructions. These computer program instructions may be loaded onto a general-purpose computer, special purpose computer, or other programmable data processing apparatus to produce a machine. These computer program instructions, which execute on the computer or other programmable data processing apparatus, create means for implementing the functions specified in the flowchart block or blocks. These computer program instructions may be stored in a computer-readable memory to direct a computer or other programmable data processing apparatus to function in a particular manner, producing an article of manufacture including instruction means which implement the function specified in the flowchart block or blocks. The computer program instructions may also be loaded onto a computer or other programmable data processing apparatus to cause a series of operational steps to be performed, producing a computer implemented process, such that the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Although specific embodiments of the present invention have been described, it will be understood by those skilled in the art that there are other embodiments that are equivalent to the described embodiments. Accordingly it is to be understood that the invention is not to be limited by the specific illustrated embodiments, but only be the scope of the appended claims.

Although checkpoint of the model build operation is described in detail above, this technique may also apply to other data mining operations, including, but not limited to, data scoring, model testing, lift computations, and feature selection.

What is claimed is:

1. A method of checkpoint model building, the model building performed by a model build process for data mining, the method comprising the steps of:
   periodically detecting a notification interrupt originating from any one of two sources, the notification interrupt notifying a checkpoint manager to initiate checkpoints and wherein one of the sources is remote from the other source;
   initiating a checkpoint on the model build process, the model building process generating models in accordance with one or more data analysis algorithms; and
   executing the checkpoint on a set of the one or more data analysis algorithms, the set based on the source of the notification interrupt;
   wherein the checkpoint enables the model build process to continue generating models from a point prior to an occurrence of model build process operation failure.

2. The method according to claim 1, wherein detection includes determining the source of the notification interrupt to a user source, the set having each of the one or more data analysis algorithms.

3. The method according to claim 1, wherein detection includes determining the source of the notification interrupt is an analysis algorithm, the set having the analysis algorithm.

4. The method according to claim 3, wherein the interrupt includes an analysis algorithm ID, the analysis algorithm ID identifying the analysis algorithms as the source.

5. The method according to claim 1, wherein the detection includes determining the source of the notification interrupt is a checkpoint manager internal timer operating in accordance with a checkpoint interval parameter from a checkpoint configuration table, the checkpoint interval parameter specifying a frequency in which to automatically perform the checkpoint on the set, the set having each of the one or more analysis algorithms.

6. The method according to claim 5, wherein the execution includes determining a checkpoint state for each of the analysis algorithms in the set, wherein the checkpoint state defines the point prior to a point of model build process operation failure.

7. The method according to claim 6, wherein the executing includes suspending the each of the analysis algorithms in the set at the checkpoint state.

8. The method according to claim 7, wherein the executing includes generating an intermediate representation based on the analysis performed by each of the analysis algorithms in the set up to the checkpoint state.

9. The method according to claim 8, wherein the execution includes storing the intermediate representation specific to each algorithm requirements, the intermediate representation including data pertaining to number of records reviewed, iterations performed, an accumulated error, a computation weight and topology.

10. The method according to claim 9, wherein the executing includes resuming each of the analysis algorithms in the set at the checkpoint state.

11. The method according to claim 6, wherein the execution includes generating an intermediate representation based on the analysis performed by each of the analysis algorithms in the set up to the checkpoint state.

12. The method according to claim 1, further comprising periodically detecting a second interrupt, the second interrupt notifying checkpoint manager to initiate one of: a re-execute checkpoint and abort model build.

13. The method according to claim 12, further comprising executing one of: the re-load checkpoint and resume model building and abort model build on one or more analysis algorithms, the executing based on the second interrupt.

14. An apparatus for checkpoint model building, the model building performed by a model build process for data mining, the apparatus comprising:
   a processor operable to execute a checkpoint manager and one or more data analysis algorithms;
   a memory operable to store a checkpoint manager and one or more data analysis algorithms executable by the processor;
   a checkpoint manager for:
      periodically detecting a notification interrupt originating from any one of two sources, the notification interrupt notifying a checkpoint manager to initiate checkpoints and wherein one of the sources is remote from the other source;
      initiating a checkpoint on the model build process, the model building process generating a model in accordance with one or more data analysis algorithms, wherein the checkpoint enables the model build process to continue generating models from a point prior to a point of model build process operation failure; and
   a set of the one or more data analysis algorithms for executing the checkpoint, the set based on the source of the notification interrupt; and
   a non-volatile storage structure for storing analysis information.

15. The apparatus according to claim 14, wherein the step for detecting includes determining the source of the notification interrupt is a user source, the set having each of the one or more data analysis algorithms.

16. The apparatus according to claim 14, wherein the steps for detecting includes determining the source of the notification interrupt is an analysis algorithm, the set having the analysis algorithm.

17. The apparatus according to claim 16, wherein the request includes an analysis algorithm ID, the analysis algorithm ID identifying one of the analysis algorithms.

18. The apparatus according to claim 14, wherein the steps for detecting includes determining the source of the notification interrupt is a checkpoint manager internal timer operating in accordance with a checkpoint interval parameter from a checkpoint configuration table, the checkpoint interval parameter specifying a frequency in which to automatically perform the checkpoint on the set, the set having each of the one or more analysis algorithms.

19. The apparatus according to claim 18, wherein the execution includes each of the analysis algorithms in the set determining a checkpoint state, wherein the checkpoint state defines the point prior to a point of model build process operation failure.

20. The apparatus according to claim 19, wherein the execution includes each of the analysis algorithms in the set suspending analysis at the checkpoint state.

21. The apparatus according to claim 20, wherein the execution includes each of the analysis algorithms in the set generating an intermediate representation based on the analysis performed by each of the analysis algorithms in the set up to the checkpoint state.

22. The apparatus according to claim 21, wherein the execution includes each of the analysis algorithms in the set storing the intermediate representation the non-volatile storage structure, the intermediate representation including data pertaining to the requirements of each specific algorithm number of records reviewed, iterations performed, accumulate error, a set of weights and topology.

23. The apparatus according to claim 22, wherein the execution includes each of the analysis algorithms in the set resuming analysis at the checkpoint state.

24. The apparatus according to claim 19, wherein the execution includes each of the analysis algorithms in the set generating an intermediate representation based on the analysis performed by each of the analysis algorithms in the set up to the checkpoint state.

25. The apparatus according to claim 24, wherein the execution includes each of the analysis algorithms in the set storing the intermediate representation the data structure.

26. The apparatus according to claim 14, further comprising the checkpoint manager periodically detecting a second interrupt, the second interrupt notifying checkpoint manager to initiate one of: a re-load checkpoint and resume model building and abort model build.

27. The apparatus according to claim 26, further comprising a set of one or more data analysis algorithms for executing one of: the re-load checkpoint and resume model building and abort model build on one or more analysis algorithms, the executing based on the second interrupt.

28. A computer program product for checkpoint model building, the model building performed by a model build process for data mining in an electronic data processing system, comprising:
   a computer readable medium;
      computer program instructions, recorded on the computer readable medium, executable by a processor, for performing the steps of:
         periodically detecting a notification interrupt originating from any one of two sources, the notification interrupt notifying a checkpoint manager to initiate checkpoints and wherein one of the sources is remote from the other source;
         initiating a checkpoint on the model build process, the model building process generating a model in accordance with one or more data analysis algorithms, wherein the checkpoint enables the model build process to continue generating models from a point prior to a point of model build process operation failure; and
      executing the checkpoint on a set of the one or more data analysis algorithms, the set based on the source of the notification interrupt.

29. The computer program product according to claim 28, wherein detection includes determining the source of the notification interrupt to is a user source, the set having each of the one or more data analysis algorithms.

30. The computer program product according to claim 28, wherein detection includes determining the source of the notification interrupt is an analysis algorithm, the set having the analysis algorithm.

31. The computer program product according to claim 30, wherein the interrupt includes an analysis algorithm ID, the analysis algorithm ID identifying the analysis algorithms as the source.

32. The computer program product according to claim 28, wherein the detecting includes determining the source of the notification interrupt is a checkpoint manager internal timer operating in accordance with a checkpoint interval parameter from a checkpoint configuration table, the checkpoint interval parameter specifying a frequency in which to automatically perform the checkpoint on the set, the set having each of the one or more analysis algorithms.

33. The computer program product according to claim 32, wherein the executing includes determining a checkpoint state for each of the analysis algorithms in the set, wherein the checkpoint state defines the point prior to a point of model build process operation failure.

34. The computer program product according to claim 33, wherein the executing includes suspending the each of the analysis algorithms in the set at the checkpoint state.

35. The computer program product according to claim 34, wherein the executing includes generating an intermediate representation based on the analysis performed by each of the analysis algorithms in the set up to the checkpoint state.

36. The computer program product according to claim 35, wherein the executing includes storing the intermediate representation the requirements of each specific algorithm, the intermediate representation including data pertaining to number of records reviewed, iterations performed, accumulated error, a set of weights and topology.

37. The computer program product according to claim 36, wherein the executing includes resuming each of the analysis algorithms in the set at the checkpoint state.

38. The computer program product according to claim 33, wherein the executing includes generating an intermediate representation based on the analysis performed by each of the analysis algorithms in the set up to the checkpoint state.

39. The computer program product according to claim 28, further comprising computer program instructions, recorded on the computer readable medium, executable by a processor, for performing the steps of:
   periodically detecting a second interrupt, the second interrupt notifying checkpoint manager to initiate one of: a re-load checkpoint and resume model building and abort model build.

40. The computer program product according to claim 39, further comprising executing one of: the re-load checkpoint and resume model building and abort model build on one or more analysis algorithms, the executing based on the second interrupt.

* * * * *